US012048987B2

(12) United States Patent
Buchanan

(10) Patent No.: US 12,048,987 B2
(45) Date of Patent: Jul. 30, 2024

(54) MULTIPLE PAWL RATCHET MECHANISM

(71) Applicant: Nigel Buchanan, Levin (GB)

(72) Inventor: Nigel Buchanan, Levin (GB)

( * ) Notice: Subject to any disclaimer, the term of this patent is extended or adjusted under 35 U.S.C. 154(b) by 58 days.

(21) Appl. No.: 17/608,064

(22) PCT Filed: Apr. 30, 2020

(86) PCT No.: PCT/EP2020/062176
§ 371 (c)(1),
(2) Date: Nov. 1, 2021

(87) PCT Pub. No.: WO2020/221913
PCT Pub. Date: Nov. 5, 2020

(65) Prior Publication Data

US 2022/0219293 A1 Jul. 14, 2022

(30) Foreign Application Priority Data

Apr. 30, 2019 (GB) ..................................... 1906089

(51) Int. Cl.
*B25B 13/46* (2006.01)
*B25B 15/04* (2006.01)

(52) U.S. Cl.
CPC ............ *B25B 13/463* (2013.01); *B25B 15/04* (2013.01)

(58) Field of Classification Search
CPC ................................ B25B 13/463; B25B 5/04
USPC ........................................................... 81/63.1
See application file for complete search history.

(56) References Cited

U.S. PATENT DOCUMENTS 6,253,646 B1 * 7/2001 Chang .................. B25B 13/462 81/59.1
8,806,986 B2 * 8/2014 Chen .................... B25B 13/463 81/62
10,456,893 B2 * 10/2019 Westerman ........... B25B 13/481
10,668,600 B1 * 6/2020 Ye ......................... B25B 13/462
10,730,168 B2 * 8/2020 Solar ...................... B25B 13/04

* cited by examiner

*Primary Examiner* — Hadi Shakeri
(74) *Attorney, Agent, or Firm* — Thibault Patent Group

(57) ABSTRACT

A ratchet comprises a head portion with a circular central housing having modular inserts in the form of three flat ring like layers, two outer fixed ramped profile layers engaged into housing locking profiles with a sequential actuating layer capable of limited rotation between. Opposing direction pawls are situated within the fixed layer ramped profiles. The actuating layer has engagement and disengagement profiles at either end of its pawl recesses projecting the incumbent pawls against the fixed layer ramped profiles in the chosen direction projecting them inwards locking the pawl teeth within the driven element teeth, whilst simultaneously disengaging the pawls facing the other direction. The actuating layer biasing protrusion resiliently projected in the chosen direction by a robust sprung plunger acting from within a switch bore, in the reverse direction the actuating layer resiliently rotates against said sprung plunger allowing the pawl teeth to resiliently slide over one another.

15 Claims, 12 Drawing Sheets

MULTIPLE PAWL RATCHET MECHANISM

CROSS REFERENCE TO RELATED APPLICATION

The present application claims priority to PCT application PCT/EP2020/062176 filed on Apr. 30, 2020, which is a PCT application of Great Britain patent application no. 1906089.6, filed on Apr. 30, 2020.

BACKGROUND

I. Field of Use

The invention relates to dual direction ratchet mechanisms used in screwdrivers and wrenches (often referred to in the United Kingdom as spanners).

II. Description of the Related Art

Ratchet wrenches may comprise a wrench head that house a driven member. The driven member may be provided with an aperture shaped to receive an item that is to be driven. For example, the aperture may be a hexagonal aperture sized to receive a particular size of fastener head/nut. Alternatively, the driven member may comprise a spigot that projects from the wrench head to allow the wrench head to be connected to a drive socket or the like. The driven member may have a circumferentially extending surface provided with a series of teeth that are engageable by the teeth of a pawl that is further located within a recess within the wrench head, the leading edge or edges of the pawl or pawls are generally wedge shaped, as are the ends of the recess that the pawl is situated in. The engagement between the pawl and teeth is such that if the wrench head is turned in a first direction the rotation of the wrench head is transmitted to the driven member in a locking manner as the corresponding pawl wedge shaped leading edge engages the said matching pawl recess end ramp. If the wrench head is turned in a second (opposite) direction the pawl resiliently slides over the teeth on the driven member against a spring used to urge the said pawl against the driven member teeth.

By this means the wrench can apply a torque to an item by turning the wrench head in the first direction and the wrench handle can be repositioned with respect to the item by turning the wrench head in the second direction. Wrenches of this type may be provided with a pair of pawls or a pawl with ramps at either ends, the pawl being selectively engageable with the driven member by means of a switch, the torque applying and handle repositioning directions of the wrench can be reversed by operation of the switch.

The majority of current prior art switchable wrench ratchets incorporate a central drive element portion having a circular toothed circumference which engages a corresponding toothed pawl which is appropriately spring biased in the chosen direction by a switch against two appropriately angled wedge ramp faces formed in the ratchet head housing against which the corresponding pawl wedge shaped outer ramp portions can be resiliently urged. The switch shaft further incorporates a bore containing a spring and plunger, the plunger is in contact with the back of the pawl opposite its front engagement teeth. The plunger, pawl contact area is formed into an arced cam with end walls such that the rotation of the switch with its incumbent spring and plunger urges the plunger against the end wall from one end wall to the other resiliently projecting the particular pawl wedge shaped outer contact portion against the required housing wedge shaped ramp portion in order to provide a suitable locking function when the ratchet is utilized in the chosen drive direction as the wedging of the pawl usefully urges the pawl teeth against the teeth of the drive portion effectively locking the drive portion within the housing. In the chosen reverse or reposition direction the housing wedge shaped ramp is caused to separate from the pawl wedge shaped ramp by the drive element teeth acting upon the pawl teeth, the switch spring and plunger resiliently urging the pawl teeth against the drive portion teeth, the typical ratchet clicking noise is caused by the corresponding teeth disengaging and engaging as they travel over one another in the reverse direction. In the drive direction the pawl as it is projected against its corresponding housing wedge shaped ramp, however the pawl teeth only truly robustly engage at or near the actual wedge shaped end contact areas, hereinafter termed engagement ramps, equivalent to approximately 40 deg. or less of the drive element teeth, the normal point of failure of most ratchets is due to over torque usage, wear or fouling of the ratchet pawl teeth, the more or larger the teeth completely engaged the less the wear or over torque problem.

As correctly illustrated in FIG. 4 U.S. Pat. No. 9,545,705 Hu when a bi-directional pawl is utilized less than half of the pawl teeth completely engage the analogous drive element teeth, furthermore this is also a similar characteristic of single direction ratchets, if the pawl and housing recess engagement ramp angles were to be modified in order to substantially improve the teeth engagement, the pawl would tend to problematically jam against the pawl recess engagement ramp, empirical testing over many years having led to this compromise. The current useable lifecycle of such a ratchet using a prior art pawl is two years in a busy professional automotive workshop environment, the pawl and its spring being classed as a consumable item.

U.S. Pat. No. 6,530,296 Liao discloses a unidirectional ratchet mechanism for a wrench utilizing a sprung ring 30 to urge a plurality of toothed pawl blocks 40 from the confines of their slots 23 evenly spaced around the central fastener drive 20 periphery into the fixed corresponding teeth 13 of the wrench head housing 12. However, the over reliance on the sprung ring 30 to retain the pawl blocks 41 teeth competently engaged with the housing teeth 13 during any high torque use of the wrench is problematic.

U.S. Pat. No. 9,140,317 Buchanan denotes a multiple pawl ratchet either one direction or dual direction, in the drive direction the pawls 46 including ramps 62 for interaction with corresponding ramps 44 within the central drive fastener or spigot wheel 134 the pawls 46 being urged into engagement in the drive direction by a sprung split ring 52 with tabs 54, the outer face of the split ring resiliently engages the sidewall 30 of the inner head housing 18. The sprung split ring tabs interact with the pawls to urge them up the ramps into toothed engagement with the correspondingly toothed driven member 134 usefully locking the ratchet in the drive direction.

In the reverse or reposition direction the pawls are driven down and out of contact with their corresponding ramps providing a ratchet like reverse sequence. In the dual direction example, the position of the pawls 376 within their dual ramped slots 330 within the ratchet head housing 316 are defined by the split ring 398 having sprung ends 400 which interact with a switch portion 412 to bias the sprung split ring 398 in the chosen drive direction, the said sprung split ring 398 having tabs located at either end of the corresponding pawls 376 which position the pawls 376 into engagement or disengagement positions as required. The switchable version requires substantial machining of the head portion inner profile and a large, screwed cover plate attached by screws incurring considerable expense in manufacture.

US 2015/0135908 Solar et al. is restricted to a unidirectional ratchet similar in most respects to U.S. Pat. No. 9,140,317 Buchanan, the pawls 18 being biased by a torsional spring ring 14 or separate compression springs as in the prior art.

Ratcheting screwdrivers have an inherent problem of low torque levels and or high reverse to drive angles, U.S. Pat. No. 9,511,484 overcomes the problem of inadequate drive pawl to shaft driven teeth torque by the use of a series of three annular beveled drive and driven gears, in use in the chosen drive direction the driven gear is engaged on the screwdriver shaft, the driven gear has annular beveled teeth on both faces, the required drive gear engaged to the handle portion, is propelled into engagement by a relevant spring, in the reposition or ratchet operation the beveled gear teeth are driven up the slopes of the interacting drive and driven gear teeth against the resilience of the relevant spring allowing a suitable ratchet action to be accomplished. However, this high torque mechanism is extremely complex and expensive both to manufacture and assemble having a minimum of 25-30 parts resulting in a tool with a very niche restricted marketplace, furthermore the use of beveled gear profiles mean that the gears have built in unwanted play as the interacting gears ride up the beveled faces of the opposing drive to driven gears into and out of engagement.

A further problem with prior art ratcheting screwdrivers is their switches are non-intuitive in that the direction defining switches are switches are operated in the opposite direction to the drive required.

It is a further object of the present invention to at least partially alleviate the above mentioned disadvantages, or to provide an alternative to existing products. In particular, to provide a dual direction ratchet with lower engagement angles than any other currently available on the market, or being capable of exceeding the current torque standards, in particular to allow the manufacturer of a more cost effective and reliable product.

SUMMARY

The invention provides a fastening tool ratchet mechanism comprising:

- a body defining a driven element chamber;
- a driven element having an outer surface provided with a plurality of driven element teeth, said driven element received in said driven element chamber;
- a plurality of generally ring-shaped inserts disposed in said chamber, said inserts each having a through-hole and comprising at least one fixed insert that is fixed in said driven element chamber, the through-hole of said at least one fixed insert defined by a wall that comprises recesses defining ramp surfaces; and
- a plurlaity of pawls having pawl teeth, siad pawls disposed in said recesses and movable along respective said ramp surfaces to cause said pawl teeth to engage with said driven element teeth to transmit a drive force from said body to said driven element,
- wherein said inserts are disposed one on top of another to define a stack of inserts in said driven element chamber, and
- wherein said plurality of inserts comprises a rotatable actuating insert and the through-hole of said rotatable insert having a wall defining a plurlaity of pawl engagement projections, said rotatable actuating insert being rotatable in said driven element chamber to move said pawls along said ramp surfaces.

The invention provides a ratchet mechanism comprising a central drive element. A head portion having a central chamber in which said drive element is received, an elongate handle or operating member having a hand gripping end and a levered head portion end. The head portion having a generally circular central chamber, the inner surface of which adjoining the handle portion having a further recess or connection undercut for the connection to the direction biasing switch by the resilient switch plunger. The head portion chamber further having modular inserts in the form of preferably three layers, two outer fixed ramped profile layers, with a sequential actuating layer capable of limited rotation between the fixed layers. The actuating layer resiliently propelled in the chosen clockwise or anticlockwise direction by in one example a known ratchet switch incorporating a sprung plunger whose engagement face acts against the said actuating layer chosen direction profile. The fixed ramped profile layer having outer locking notches which mechanically engage with the corresponding head portion locking profiles, the said fixed profile further utilizing ramped profiles within its central profile, preferably three sets of generally equally spaced opposing direction pawls are situated within said corresponding ramped profiles. The middle sequential actuating layer has preferably close contact engagement and disengagement profiles at either end of its pawl recesses, these said profiles project in the chosen direction the incumbent pawls against the corresponding fixed layer ramped profiles in the chosen clockwise or anticlockwise drive direction whilst simultaneously disengaging the pawls facing in the opposite direction, the said pawls outer ramped profile acting against the corresponding fixed layer pawl ramped profile in the chosen drive direction, the drive engaged pawls teeth forced into engagement with the drive element teeth in order to drive as required the same, the opposing disengaged pawls simultaneously propelled as required from drive element contact into the further recess formed within the wide end of the fixed layer ramped profiles, further effected by the reclining shape of the opposing pawl and drive element teeth. When utilized in the reverse or reposition direction the actuating layer with its incumbent pawls, resiliently circumferentially rotating against the said resilient sprung plunger, further allowing the pawl teeth engaged within the drive element teeth to resiliently slide over one another during the reposition action.

The present invention is characterized by the use of a mid-located, sequentially actuating layer, in the preferred iteration being both planar and ring like in construction in order that it can be stamped or fine blanked in manufacture instead of using expensive machining.

The present invention utilizes a preferably mid located, sequentially actuating layer, characterized by the actuation layer having a biasing protrusion incorporating a sprung plunger transfer profile with directional profiles incorporated at its outer ends.

The present invention utilizes a preferably mid located, sequentially actuating layer incorporating a biasing protrusion, which is further characterized by inwardly relieved scallops usefully forming plunger contact retaining indents within their directional profiles, further usefully preventing the switch from disengaging from its ordained operating position particularly when the present invention is rapidly utilized in the reverse or reposition direction.

The present invention is further characterized by the use of top and bottom or outer located, fixed ramped profile layers, in the preferred iteration being both flat and ring like in construction in order that they can be easily stamped or fine blanked in manufacture instead of using expensive machining. These modular inserts are robustly held in position within the head portion chamber by the use of location notches in conjunction with corresponding locking profiles within the head portion inner profile. One of the said notches is preferably distinctly larger than the others, the orientation notch, in order to provide a method of correct assembly orientation of the said fixed ramped profile layers within the said chamber location profile.

The present invention is even further characterized by having engagement and disengagement profiles at either end of its actuating layer pawl recesses preferably in close contact with the pawl engagement and disengagement faces, these said profiles project in the chosen direction the incumbent pawls against the corresponding fixed layer ramped profiles in the chosen clockwise or anticlockwise drive direction whilst simultaneously disengaging the pawls facing in the opposite direction, the engaged pawls teeth engaging with the drive element teeth in order to drive as required the same.

The present invention is even further characterized whereas the actuating layer is resiliently propelled in the chosen clockwise or anticlockwise direction by a sprung plunger whose engagement face acts against the said actuating layer chosen direction profile, when utilized in the reverse or reposition direction the actuating layer with its incumbent pawls, resiliently circumferentially rotating back against the said resilient sprung plunger, further allowing the pawl teeth engaged within the drive element teeth to resiliently slide over one another during the reposition or reverse action. In one example the sprung plunger is incorporated within a known dual direction ratchet switch having a direction lever.

The present invention is even further characterized whereas the actuating layer is resiliently propelled in the chosen clockwise or anticlockwise direction by a sprung plunger whose engagement face acts against the said actuating layer chosen direction profile, when utilized in the reverse or reposition direction the actuating layer with its incumbent pawls, resiliently circumferentially rotating back against the said resilient sprung plunger, further allowing the pawl teeth engaged within the drive element teeth to resiliently slide over one another during the reposition or reverse action. In a further example the sprung plunger is incorporated within an intermediate rocker switch positionally controlled by in one example a direction biasing control ring.

The present invention is even further characterized by the use of at least two sets of pawls within their corresponding pawl recesses, the utilized drive pawls are arranged to sequentially engage at the same time, the actuating layer engagement profiles acting simultaneously upon the pawl first biasing faces, robustly engaging the pawl teeth within the drive element teeth during the drive sequence, whilst simultaneously disengaging the pawls facing in the opposite direction.

The present invention is even further characterized by the use of at least three sets of pawls within their corresponding pawl recesses, the utilized drive pawls can be arranged to sequentially engage at the same time causing the actuating layer engagement profiles to act simultaneously upon the pawl first biasing faces, robustly engaging the pawl teeth into the drive element teeth during the drive sequence, the drive element thereby gripped in a manner by the three operated pawls similar to a three jaw chuck reducing the requirement for robust axle bearing surfaces within the closure portions. This configuration results in an extremely robust dual direction ratchet mechanism, this arrangement further provides a superior amount of pawl teeth to be capable of full engagement within the drive element teeth during the drive sequence yet with the correct ramped profile angles chosen, effortlessly disengage the pawl ramp profiles from their corresponding fixed pawl recess ramped profiles in the reverse or reposition direction. The pawl ramp profiles having a suitable gap from the pawl recess engagement ramp profiles during the reverse or reposition action to allow the pawl teeth to adequately disengage from the drive element teeth.

The present invention is even further characterized by the use of at least two but preferably three sets of pawls within their corresponding pawl recesses, the utilized drive and disengaged pawls arranged to sequentially engage whereas each actuating layer pawl recesses, engagement and disengagement profiles sets are located in one example, one third of a tooth out from the corresponding said corresponding sets causing the actuating layer engagement profiles to act to robustly fully engage the pawl teeth of only one pawl, into the drive element teeth during the drive sequence.

The six pawls divided into three sets of pawls, and each of the three sets is clocked differently to the drive element such that when the drive pawl of one set is engaged with the drive element teeth, one or other of the pawl set drive teeth is only partially engaged (e.g., one third of the pawl tooth arc engaged) and the remaining set pawl drive teeth are partially disengaged (e.g., one third of the pawl tooth arc disengaged). This arrangement can provide a coarse tooth pattern of for example 72 teeth to be utilized whilst providing a drive teeth equivalent to 72 times 3 or 216 equivalent toothed dual direction ratchet. As the angle between reverse and drive can be problem when used in situations where there is a restricted handle levered portion arc this is a significant enhancement over prior art dual direction ratcheting screwdrivers, ratchet wrenches or socket drives.

The present invention is even further characterized by the provision of a direction biasing switch which may be similar to that in the prior art, the switch axle capable of rotation within the head portion switch bore, the switch axle having a further blind cavity cross bore for the sliding fit of the plunger cylinder and its outwardly biasing switch spring, the switch being rotatable within an arc allowing said sprung plunger to be switched as required between the actuating layer biasing direction profiles in order to bias in the required direction the actuating layer pawl engagement ramp profiles against the pawl first biasing faces in order to provide clock or anti-clockwise drive directions.

In a further utilization of the present invention the dual direction ratchet is incorporated into a screwdriver using a switch ring to determine the drive direction of the said ratchet. In the first aspect, the present invention provides a dual direction, ratcheting screwdriver, comprising a handle portion with a proximal end and a distil end, the handle proximal end robustly incorporates the housing encapsulated ratchet mechanism with its outer facing direction biasing switch ring within its profile. The housing is connected to the drive element portion, of the rotatable elongate shaft of the screwdriver in order to transmit motion and torque to the elongate shaft as required, in the direction required. The housing having a central chamber in which the said drive element portion of the elongate shaft is received. The preferably die cast housing having a generally circular central chamber, the inner surface of which, adjoining the direction biasing switch ring direction ascertaining groove, has a connection slot for the required outward connection to the direction biasing ring switch, by the intermediate rocker switch housing, which further incorporates axles capable of positional rotation within corresponding molded axle shaped formations located within the housing wall. The rocker switch elongate housing further incorporates a resilient sprung plunger within its related bore. The said housing chamber having in one example for ease of manufacture, modular inserts in the form of preferably three layers, two outer fixed ramped profile layers with a sequential actuating layer capable of limited rotation between the fixed layers. The fixed ramped profile layer having locking notches on their periphery which mechanically engage with the corresponding housing chamber locking profiles, the said fixed ramped profile layer, further utilizing ramped profiles within their central profile, preferably three sets of equally spaced opposing direction pawls are situated within said corresponding ramped profiles. The middle sequential actuating layer has engagement and disengagement profiles at either end of its pawl recesses, these said profiles project in the chosen direction the incumbent pawls against the corresponding fixed layer ramped profiles in the chosen clockwise or anticlockwise drive direction whilst simultaneously disengaging the pawls facing in the opposite direction, the said pawls outer ramped profile acting against the corresponding fixed layer pawl ramped profile in the chosen drive direction causing the engaged pawls teeth to engage with the drive element teeth in order to drive as required the same. In order to activate the screwdriver in the chosen direction the operator rotates the switch ring into its required position, thereby swiveling the switch ring rocker around its axles whereby the actuating layer is resiliently propelled in the chosen clockwise or anticlockwise direction by the said ring switch rocker internal sprung plunger, the sprung plunger engagement face acting against the said actuating layer chosen direction profile. Utilized in the reverse or reposition direction the actuating layer with its incumbent pawls, resiliently circumferentially rotating against the said resilient sprung plunger, further allowing the pawl teeth engaged within the drive element teeth to resiliently slide over one another during the reverse or reposition action. In order to ensure the continuance of the chosen switched direction the housing can further employ a bore with a sprung ball detent which can act against a suitable indent within the switch ring as a locator.

The present invention is even further characterized by the provision of a direction biasing switch whereas in order to activate the screwdriver in the chosen direction the operator rotates the known switch ring into its required position, characterized by the incorporation of an intermediate switch ring rocker which can usefully swivel around its axles propelled by the interaction of its actuating profile with the switch ring ascertaining recess, whereby the actuating layer is resiliently propelled in the chosen clockwise or anticlockwise direction by the said ring switch rocker internal sprung plunger, the sprung plunger engagement face acting against the said actuating layer chosen direction profile.

While one or more preferred embodiments of the preferred invention have been described above, it should have been understood that any and all equivalent realizations of the present invention are included within the scope and spirit thereof The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope of appended claims.

BRIEF DESCRIPTION OF THE DRAWINGS

The features, advantages, and objects of the embodiments of the present invention will become more apparent from the detailed description as set forth below, when taken in conjunction with the drawings in which like referenced characters identify correspondingly throughout, and wherein.

REFERENCE TO THE DRAWINGS

Figure 1:
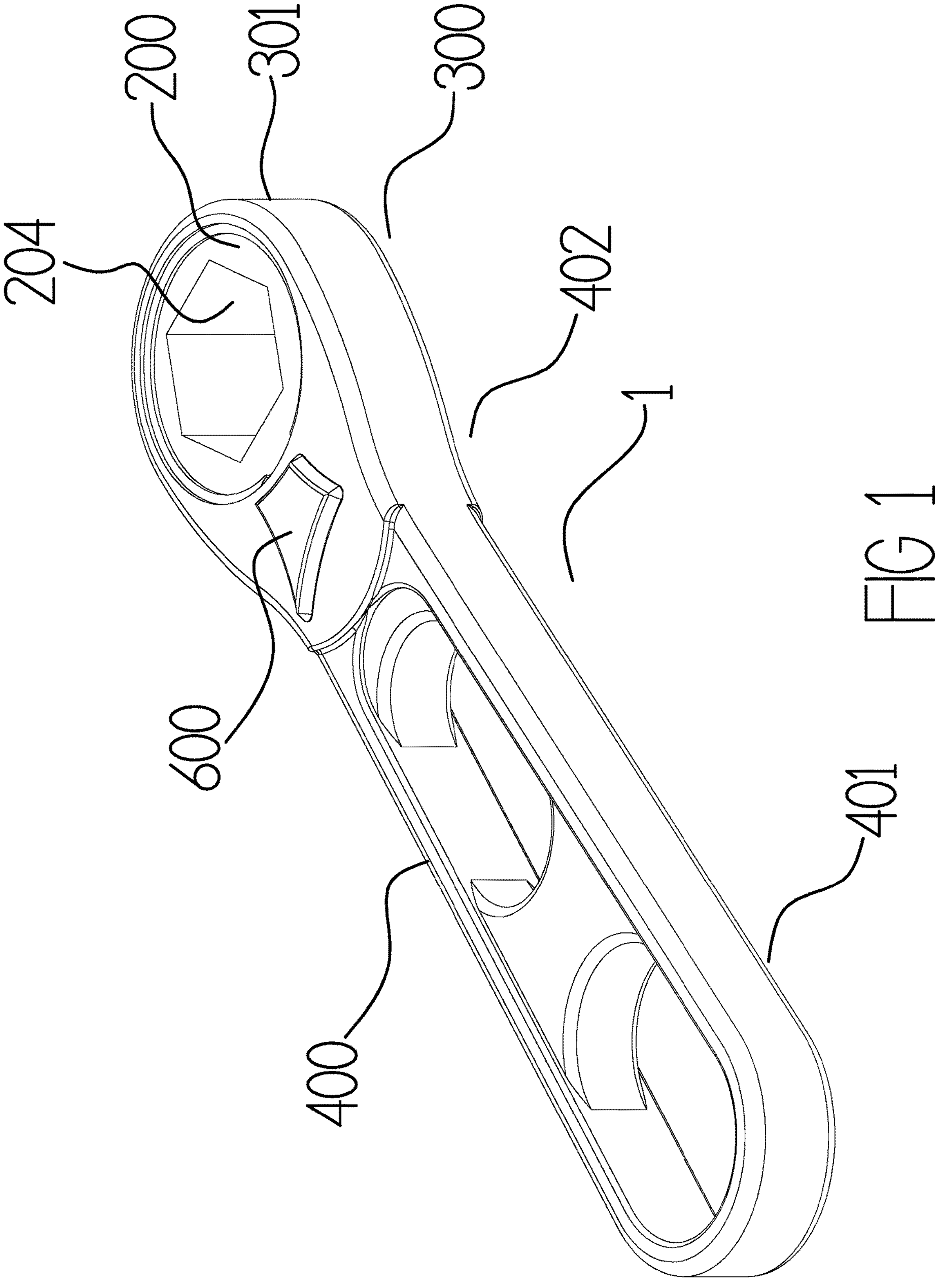
FIG. 1 is a perspective view of the ratchet mechanism incorporating a switch and a fastener drive profile.

Following is a listing of the various components used in the best mode preferred embodiment and alternative embodiments. For the ready reference of the reader the reference numerals have been arranged in ascending numerical order.

11 Multiple Pawl Ratchet
200/Driven Element
201/Driven Element Circumferential Toothed Portion
202/Driven Element Teeth
203/Driven Element Spigot
204/Driven Element Fastener Operating Profile
205/Screwdriver Driven Element
206/Screwdriver Driven Element Teeth
207/Screwdriver Tip
208/Screwdriver Shaft
300/Head Portion
301/Head Portion Outer Profile 302/Head Portion Inner Profile
303/Head Portion Ramped Layer Locking Profiles
304/Head Portion Ramped Layer Location Profile
305/Head Portion Switch Bore
306/Head Portion Connection Undercut
307/Head Portion Closure Portion
308/Head Portion Closure Clip
309/Head Portion Central Chamber
4001 Handle Portion
4011 Handle Levering End
4021 Handle Levered End
4031 Screwdriver Handle Proximal End
4041 Screwdriver Handle Distal End
5001 Pawl
5011 Pawl Toothed Face
5021 Pawl Teeth
5031 Ramp Profile
5041 Pawl Engagement Biasing Face
5051 Pawl Dis-Engagement Biasing Face
5061 Pawl Set A
5071 Pawl Set B
5081 Pawl Set C
600/Switch
6011 Switch Operating Lever
602/Switch Axle
6031 Switch Axle Plunger Bore
6041 Switch Spring
6051 Switch Sprung Plunger
6061 Sprung Plunger Engagement Face
607/Direction Biasing Switch Ring
6081 Switch Ring Direction Ascertaining Recess
6091 Intermediate Rocker Switch
6101 Rocker Switch Axles
611/Rocker Switch Plunger Bore
612/Rocker Switch Plunger Housing
613/Rocker Switch Actuating Profile
614/Switch Ring Spring and Ball Detent
615/Switch Ring Detent Indent
616/Plunger Cylinder
617/Switch Ring Clip
618/Switch Ring Clip Groove
700/Fixed Ramped Profile Layer
701/First Ramped Profile
702/Second Ramped Profile
703/Ramped Profile Set A
704/Ramped Profile Set B
705/Ramped Profile Set C
706/Fixed Layer, Locking Notch
707/Fixed Layer, Location Notch
708/Fixed Layer, Centralizing Face
709/Fixed Layer, Central Profile
710/Fixed Layer, Pawl Recess Gap
800/Actuating Layer
8011 Actuating Layer Biasing Protrusion
8021 Pawl Engagement Profile
8031 Pawl Disengagement Profile
8041 Actuating Layer Direction Profile
8051 Actuating Layer Transfer Profile
8061 Actuating Layer Resilient Plunger Positional Indent
807 Pawl Engagement Set A
8081 Pawl Engagement Set B
8091 Pawl Engagement Set C
8101 Actuating Layer Pawl Recesses
9001 Housing
9011 Housing Central Chamber
9021 Housing Central Chamber Locking Profiles
9031 Housing Screwdriver Shaft Axle Bore
9041 Housing Wall
9051 Housing Gripping Ribs
9061 Housing Closure Clip Groove
907/Housing Rocker Switch Connection Slot
9081 Housing Ball Detent Bore
9091 Housing Switch Ring Clip Groove
9101 Housing Molded Axle Slot CWDI Clockwise Direction
ACWDI Anti - Clockwise Direction
RI Reverse or Reposition

DETAILED DESCRIPTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore specific structural and functional details disclosed herein are not to be interpreted as being limiting, but merely as a basis for the claims and as one skilled in the art to variously employ the invention.

FIGS. 1-7 illustrate the embodiments of a multiple pawl ratchet mechanism 1 comprising a head portion 300 having a central chamber 309 in which a driven element 200 is received, a handle portion 400 having a levering end 401 and a levered end 402. The circular central chamber 309, the inner surface 302 of which adjoining the handle portion 402 having a further recess or connection undercut 306 for the connection to the actuating layer direction biasing protrusion 804 by the resilient switch plunger 605. The head portion chamber 309 further having modular inserts in the form of preferably three layers, two outer fixed ramped profile layers 700 with a sequential actuating layer 800 capable of limited rotation between the said fixed layers 700. The fixed ramped profile layer 700 having outer locking notches 706 which mechanically engage with the corresponding head portion locking profiles 303, the said fixed profile layer 700 further utilizing first and second ramped profiles 701, 702 within its central profile 709, preferably three sets 506, 507, 508 of equally spaced opposing direction pawls 500 are situated within said corresponding ramped profiles 701, 702. The middle sequential actuating layer 800 has engagement 802 and disengagement 803 profiles at either end of its pawl recesses 801, these said profiles 802, 803 project in the chosen direction the incumbent pawls 500 against the corresponding fixed layer ramped profiles 701, 702 in the chosen clockwise CWD or anticlockwise drive direction ACWD whilst simultaneously disengaging the said pawls 500 facing in the opposite direction, the said pawls 500 outer ramped profile 503 acting against the corresponding fixed layer pawl ramped profile 701 or 702 in the chosen drive direction CWD or ACWD. The engaged pawls teeth 502 engaging with the driven element teeth 202 in order to drive as required the same. The actuating layer 800 is resiliently propelled in the chosen clockwise or anticlockwise direction by in one example a known ratchet switch 600 having a sprung plunger 605 whose engagement face 606 acts against the said actuating layer 800 chosen sprung plunger positional indent 806, when utilized in the reverse or reposition direction R the actuating layer 800 with its incumbent pawls 500, resiliently circumferentially rotating against the said sprung plunger 605, further allowing the pawl teeth 502 engaged within the drive element teeth 202 to resiliently slide over one another during the reposition R action.

Figure 2:
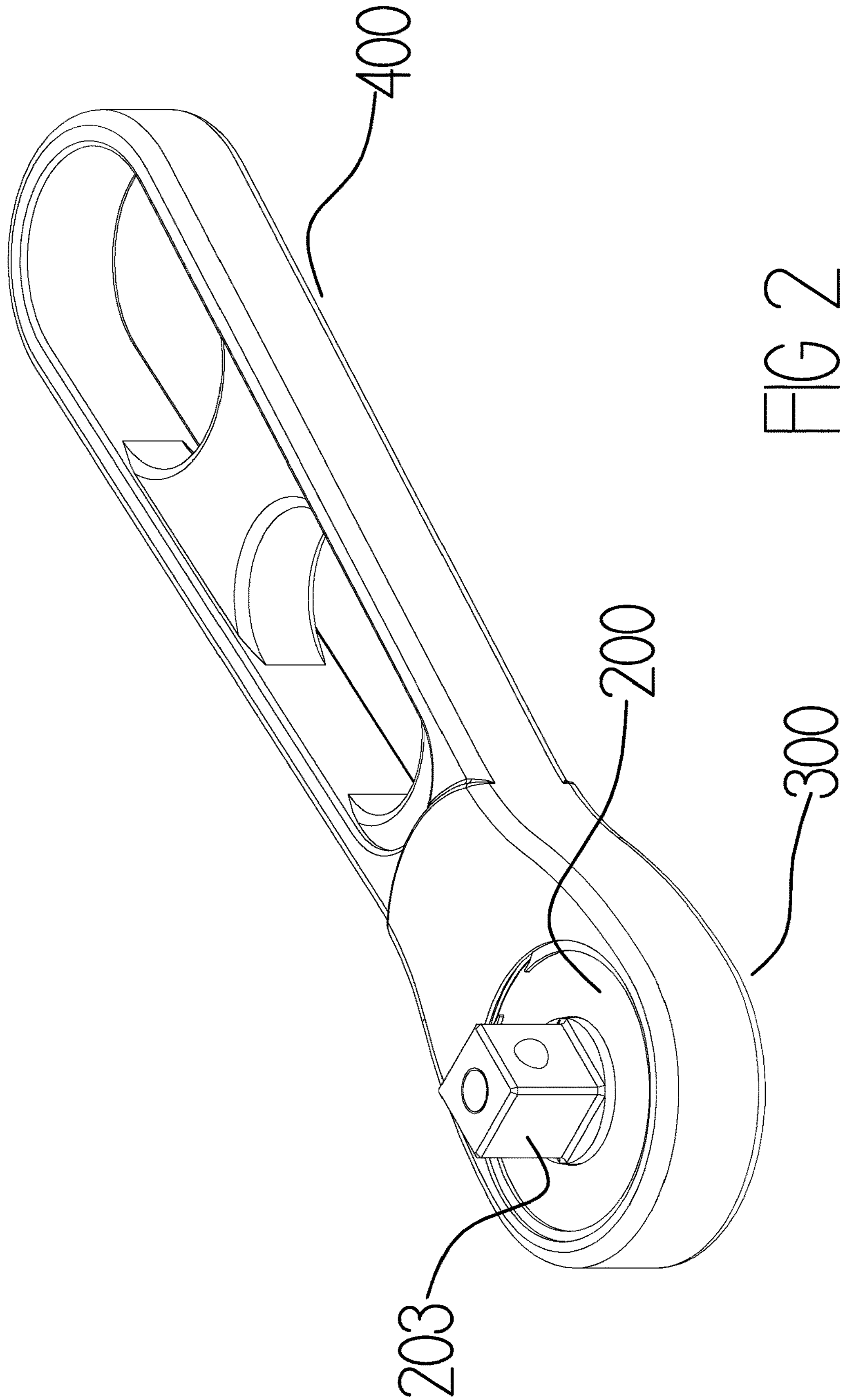
FIG. 2 is a perspective view of the ratchet mechanism incorporating a switch and a spigot for connection with known sockets.

FIGS. 1 and 2 further illustrate the ratcheting mechanism 1, denoting an elongate handle operator levering end 401 at one end and a levered end 402 incorporating a head portion 300 with a drive element spigot 203 or alternately a fastener operating profile 204 incorporated within the drive element 200. The drive direction switch 600, closure portion with its retaining clip 308 are further shown.

Figure 3:
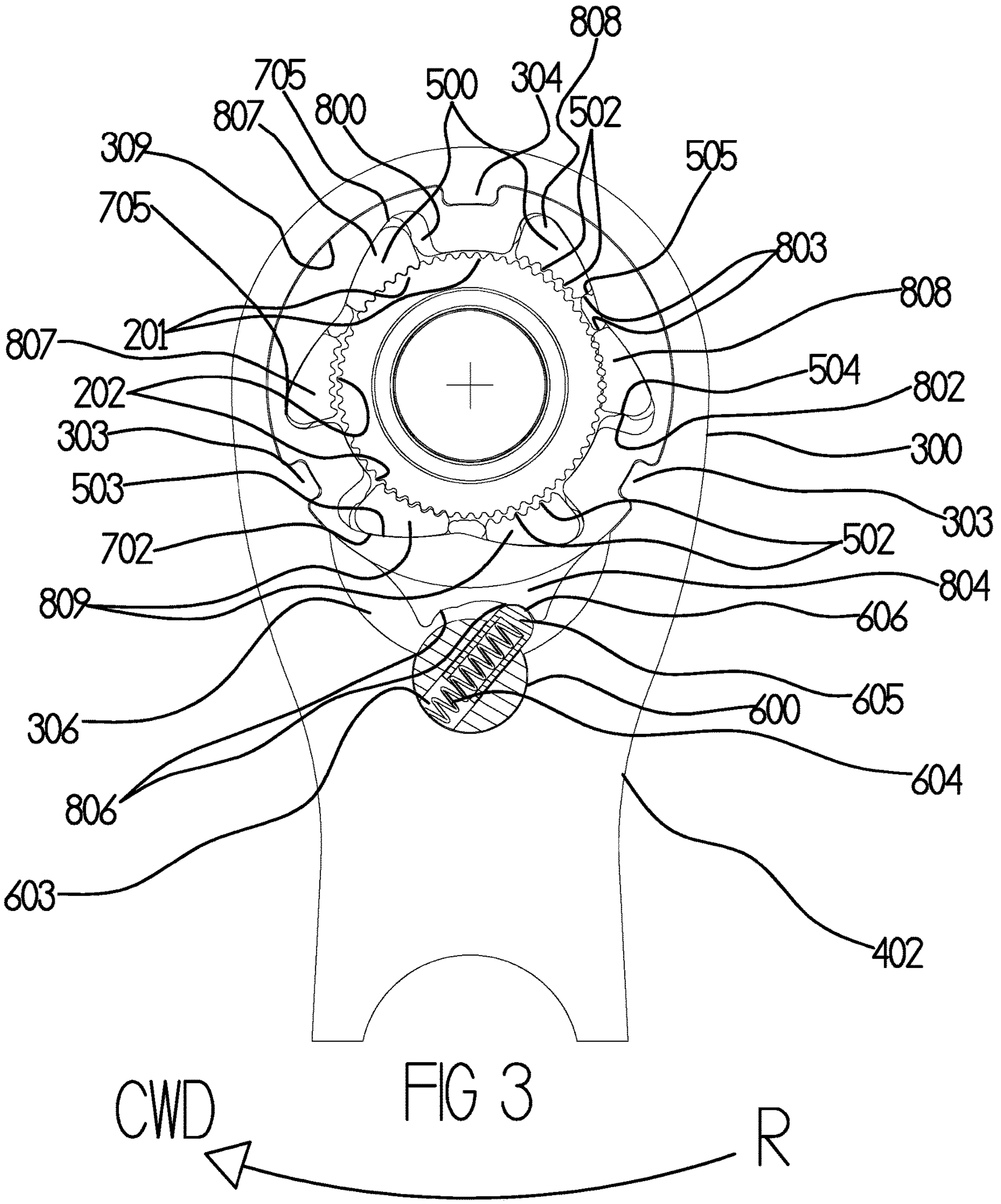
FIG. 3 is a front view of the ratchet mechanism operated in the clockwise direction, the closure washer is removed (not shown) and a part of the handle levered end and the switch are shown in section for display purposes.
Figure 4:
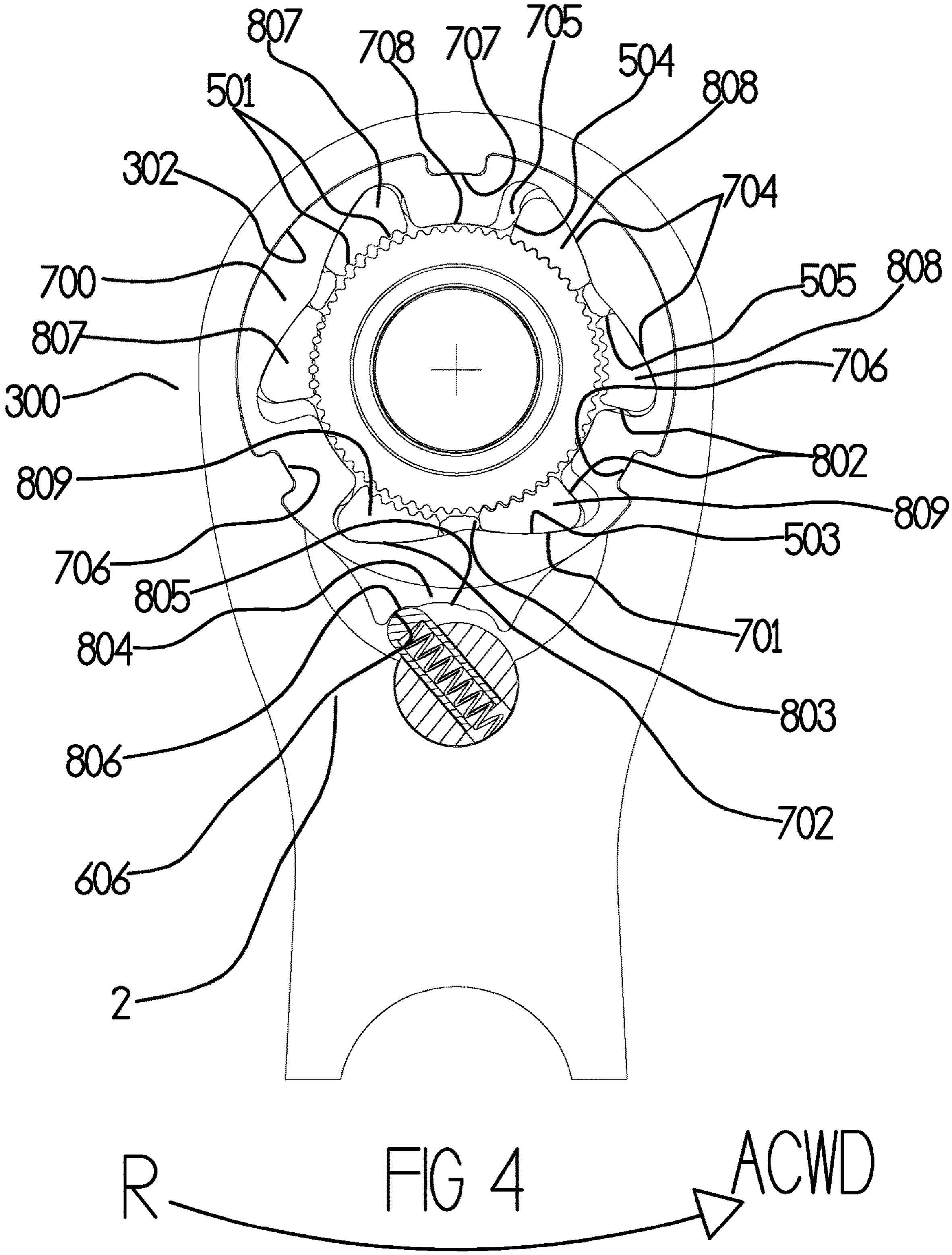
FIG. 4 is a front view of the ratchet mechanism operated in the anti-clockwise direction, the closure washer is removed (not shown) and a part of the handle levered end and the switch are shown in section for display purposes.

FIGS. 3 and 4 further illustrates the ratchet mechanism 1, with the closure portion 307 removed (not shown), the biasing switch 600 and head portion 300 shown partially in section. The sprung plunger 605 engagement face 606 urged against the actuating layer plunger positional indent 806 of the actuating layer direction biasing protrusion 804, the switch spring 604 further resiliently acting to circumferentially bias the actuating layer 800 in the chosen anti-clockwise ACWD as in FIG. 3 or clockwise CWD as in FIG. 4 direction. The circular central chamber 309, the inner surface 302 of which adjoining the handle portion 402 having a further recess or connection undercut 306 for the connection to the actuating layer direction biasing protrusion 804 by the resilient switch plunger 605. The head portion chamber 309 further having modular inserts in the form of preferably three layers, two outer fixed ramped profile layers 700 with a sequential actuating layer 800 capable of limited rotation between the said fixed layers 700. The fixed ramped profile layer 700 having outer locking notches 706 which mechanically engage with the corresponding head portion locking profiles 303, the said fixed profile layer 700 further utilizing first and second ramped profiles 701, 702 within its central profile 709, preferably three sets of equally spaced opposing direction pawls 506, 507, 508 are situated within said corresponding ramped profiles 701, 702. The middle sequential actuating layer 800 has engagement 802 and disengagement 803 profiles, said profiles 802, 803 project in the chosen direction the incumbent pawls 500 against the corresponding fixed layer ramped profiles 701, 702 in the chosen clockwise CWD or anticlockwise ACWD drive direction whilst simultaneously disengaging the said pawls 500 facing in the opposite direction, the said pawls 500 outer ramped profile 503 acting against the corresponding fixed layer pawl ramped profile 701 or 702 in the chosen clockwise or anticlockwise drive direction CWD or ACWD. The engaged pawls teeth 502 engaging with the driven element teeth 202 in order to drive as required the same. When utilized in the reverse or reposition direction R the actuating layer 800 with its incumbent pawls 500, resiliently circumferentially rotating against the said sprung plunger 605, further allowing the pawl teeth 502 engaged within the drive element teeth 202 to resiliently slide over one another during the reposition R action.

Further shown in FIGS. 3 and 4 is an example of the present invention 1 whereas the utilized drive and disengaged pawls 500 are arranged to sequentially engage whereas each actuating layer 800 engagement and disengagement profile set A, B and C 807, 808 and 809 are located one third of a tooth out from the corresponding said corresponding sets 807, 808 and 809 causing the actuating layer engagement profiles 802 to act to robustly fully engage the pawl teeth 502 of only one pawl 500, into the driven element teeth 202 during the drive sequence.

The six pawls 500 divided into three sets of pawls, set A 506, set B 507 and set C 508, and each of the said three sets 507, 508 and 509 is clocked differently to the drive element teeth 202 such that when the drive pawl 507, 508 or 509 of one set is engaged with the drive element teeth 202, one or other of the pawl set drive teeth 502 is only partially engaged (e.g., one third of the pawl tooth 502 arc engaged) and the remaining set pawl drive teeth 502 are partially disengaged (e.g., one third of the pawl tooth arc disengaged).

Figure 5:
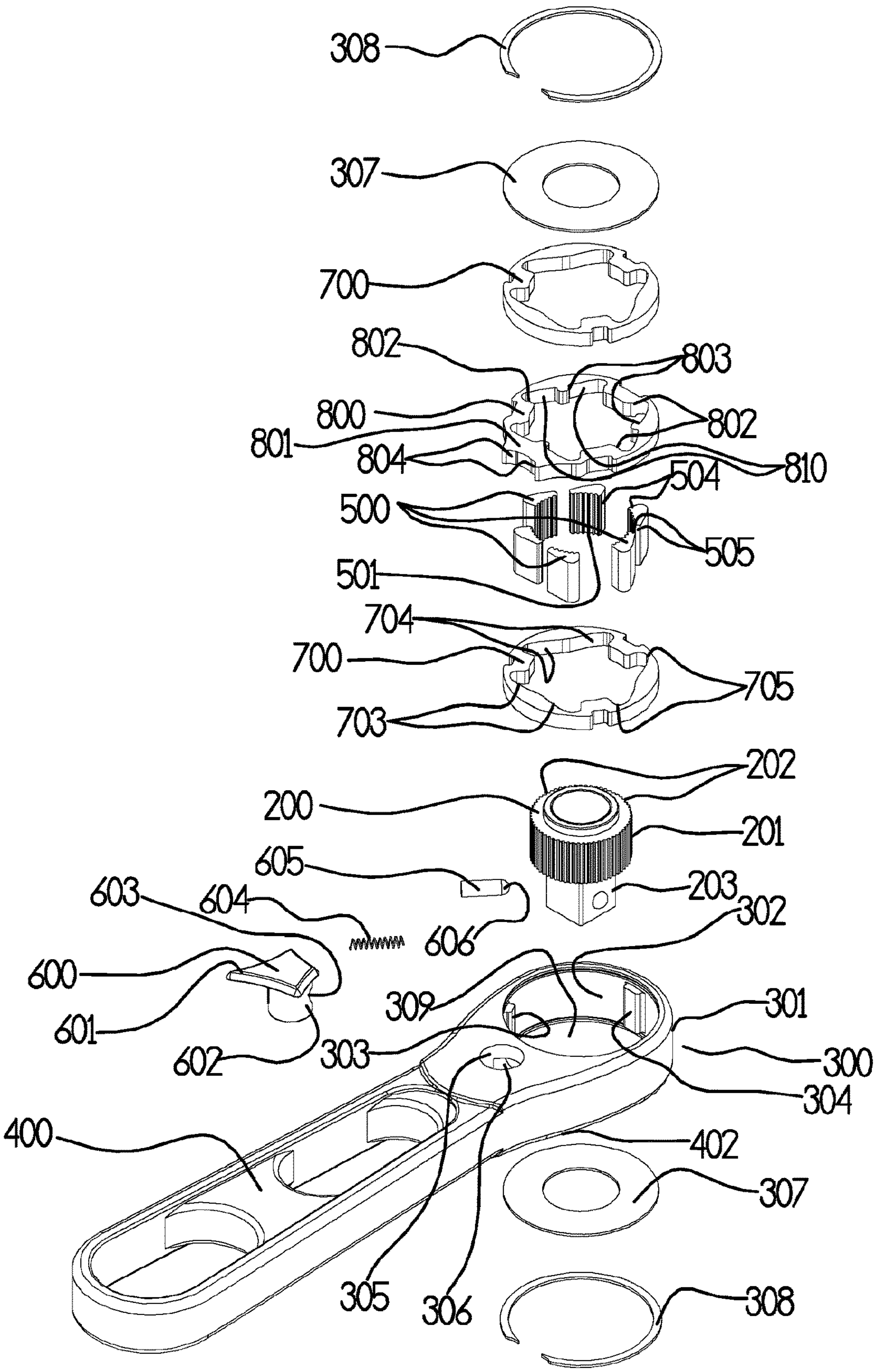
FIG. 5 is a perspective view of the ratchet mechanism, the parts shown dismantled for display purposes.
Figure 6:
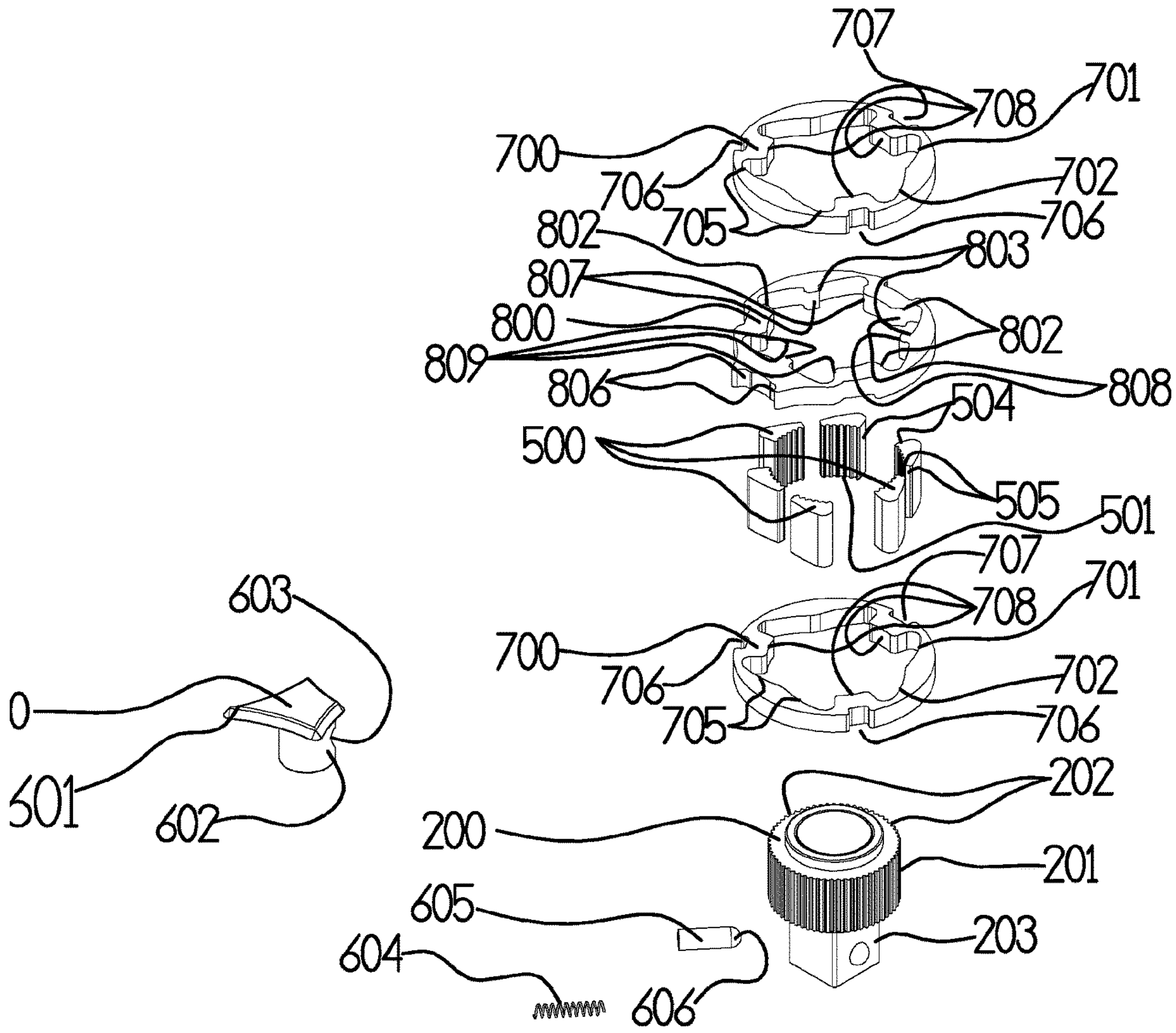
FIG. 6 is a perspective view of the internal parts of ratchet mechanism plus the switch, the parts shown dismantled for display purposes.

FIGS. 5 and 6 further illustrate in perspective the multiple pawl ratcheting mechanism 1, denoting the parts shown dismantled for display purposes. The handle 400 and its levered end 402, incorporating the head portion 300, head portion outer surface 301, inner surface 302, locking profiles 303, location profile 304, switch bore 305, connection undercut 306, closure portion 307, closure clip 308 and central chamber 309. The driven element 200, circumferential toothed portion 201, element teeth 202 and element spigot 203. The pawls 500, toothed face 501, engagement biasing face 504 and disengagement biasing face 505. The switch 600, operating lever 601, axle 602, axle plunger bore 603, spring 604, sprung plunger 605 and plunger engagement face 606. Fixed ramp profile layer 700, first ramped profile 701, second ramped profile 702, ramped profile set A 703, ramped profile set B 704, ramped profile set C 705, locking notch 706, location notch 707 and centralizing face 708. Actuating layer 800, biasing protrusion 801, pawl engagement profile 802, pawl disengagement profile 803, direction profile 804, pawl engagement set A 807, pawl engagement set B 808 and pawl engagement set C 809.

Figure 7:
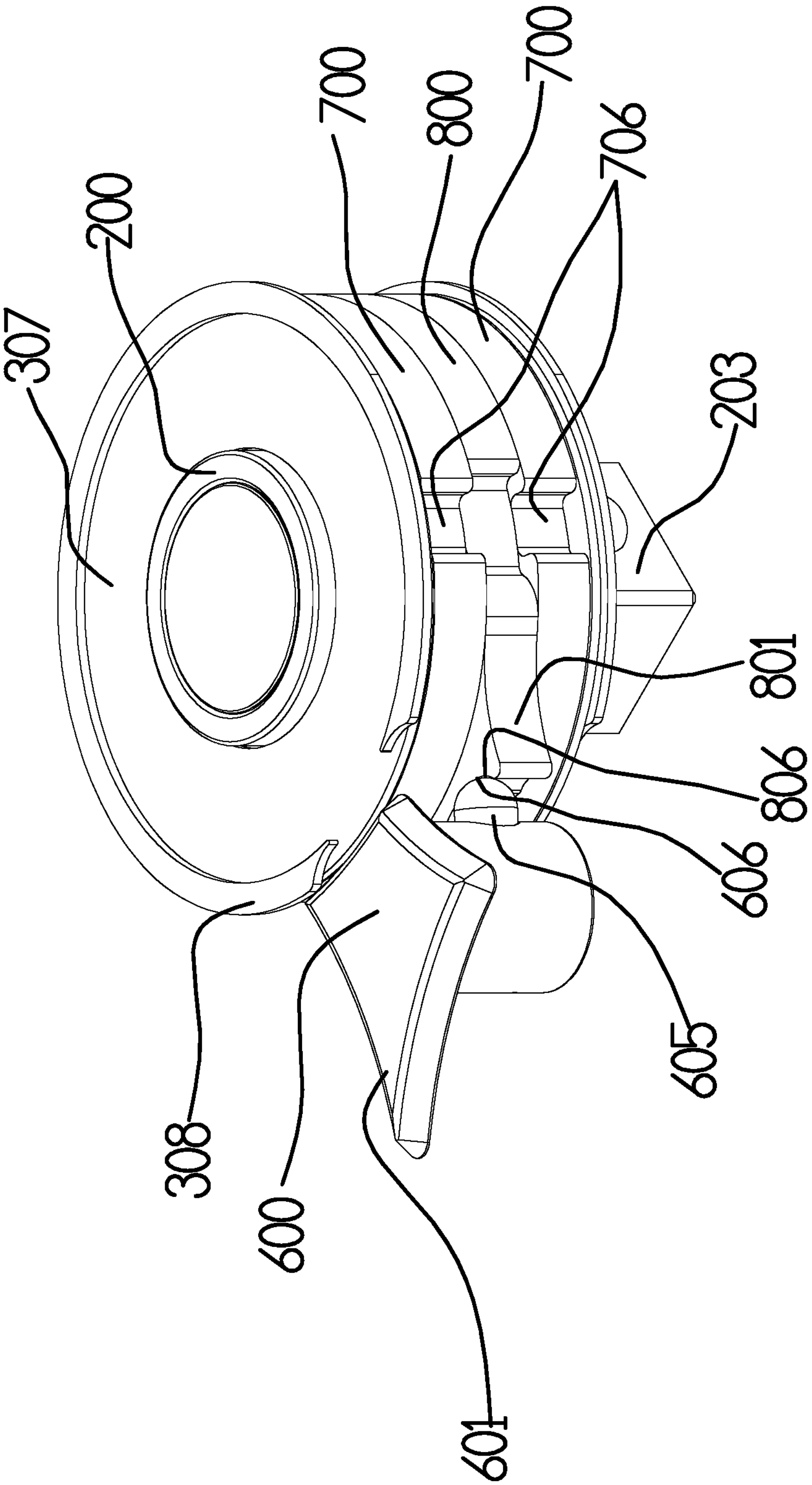
FIG. 7 is a perspective view of the assembled internal parts of the ratchet mechanism plus the switch.

FIG. 7 further illustrates in perspective the multiple pawl ratcheting mechanism 1, driven element 200, switch 600, fixed ramped profile layer 700 and actuating layer 800 in isolation in order to demonstrate their internal function. The fixed layer locking notches 706 secure the said fixed layer 700 from circumferential motion. The said switch operation lever 601 directing the sprung plunger 605 engagement face 606 into the actuating layer resilient plunger positional indent 806 within the actuating layer direction profile 804 resiliently urging the actuating layer in the anticlockwise direction ACWD. Further shown are the drive element spigot 203, the closure portion 307 and its clip 308.

FIGS. 7 to 12 further illustrate in perspective a further utilization of the present invention whereas the dual direction ratchet 1 is incorporated into a dual direction ratcheting screwdriver using a direction biasing switch ring 607 to determine the operating direction of the said ratchet 1. In the first aspect, the present invention provides a dual direction, ratcheting screwdriver 1, comprising a handle portion 400 with a proximal end 403 and a distil end 404, said handle proximal end 403 robustly incorporates the housing 900 encapsulated ratchet mechanism 1 with its outer facing direction biasing switch ring 607 within its profile. The housing 900 is connected to the screwdriver driven element portion 205, of the rotatable elongate shaft 208 in order to transmit motion and torque to the said shaft 208 as required, in the direction required. The housing 900 having a central chamber 901 in which the said driven element portion 205 of the said shaft 208 is received. The preferably die cast housing outer wall 904, has a connection slot 907 for the required outward connection to the direction biasing ring switch 607 direction ascertaining recess 608 by the intermediate rocker switch 609, which further incorporates axles 610 capable of positional rotation within corresponding molded axle slot shaped formations 910 located within said housing outer wall 904. The rocker switch plunger housing 612 further incorporates a resilient sprung plunger 605 within its related bore 611. The said housing central chamber 901 having in one example for ease of manufacture, modular inserts in the form of preferably three layers, two outer fixed ramped profile layers 700 with a sequential actuating layer 800 capable of limited rotation between the said fixed layers 700. The fixed ramped profile layer 700 having outer locking notches 706 which mechanically engage with the corresponding housing central locking profiles 902, the said fixed profile layer 700 further utilizing first and second ramped profiles 701, 702 within said central profile 709, preferably three sets of equally spaced opposing direction pawls 500 are situated within said corresponding ramped profiles 701, 702. The middle sequential actuating layer 800 has engagement 802 and disengagement 803 profiles at either end of its pawl recesses 801, these said profiles 802, 803 project in the chosen direction the incumbent pawls 500 against the corresponding fixed layer ramped profiles 701, 702 in the chosen clockwise CWD or anticlockwise drive direction ACWD whilst simultaneously disengaging the said pawls 500 facing in the opposite direction, the said pawls 500 outer ramped profile 503 acting against the corresponding fixed layer pawl ramped profile 701 or 702 in the chosen drive direction CWD or ACWD. The engaged pawls teeth 502 engaged with the screwdriver driven element teeth 206 in order to drive as required the same. The actuating layer 800 is resiliently propelled in the chosen clockwise or anticlockwise direction by the intermediate rocker switch 609 having a sprung plunger 605 whose engagement face 606 acts against the said actuating layer 800 chosen sprung plunger positional indent 806, when utilized in the reverse or reposition direction R the actuating layer 800 with its incumbent pawls 500, resiliently circumferentially rotating against the said sprung plunger 605, further allowing the pawl teeth 502 engaged within the drive element teeth 202 to resiliently slide over one another during the reposition R action.

Figure 8:
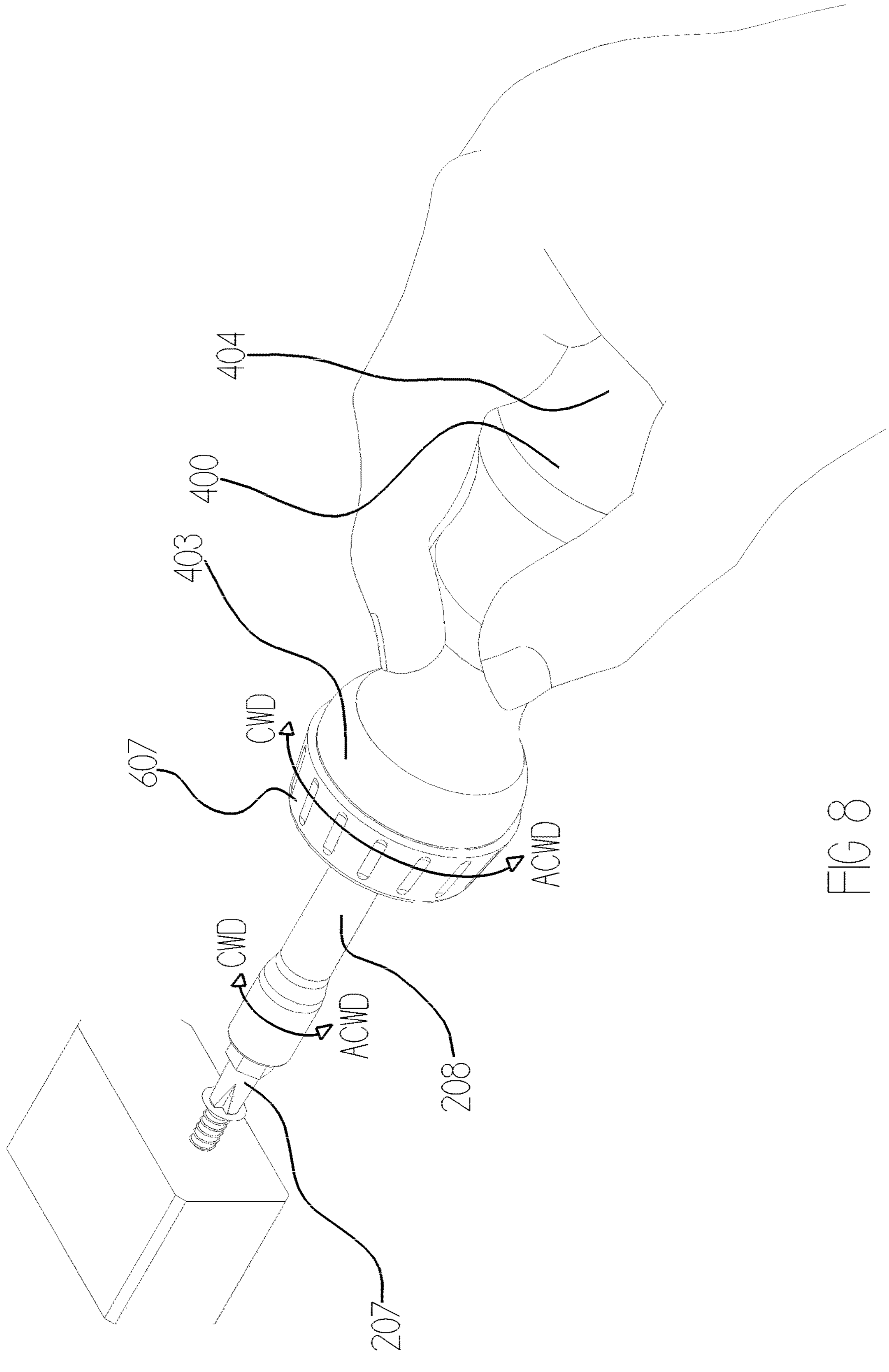
FIG. 8 is a perspective view of the screwdriver version of the device being used by an operator.

FIG. 8 further illustrates in perspective the dual direction ratchet 1 incorporated into a dual direction ratcheting screwdriver. An operator gripping the handle portion 400, further illustrated the direction biasing switch ring 607 anticlockwise direction switch direction ACWD being identical to that of the screwdriver shaft 208.

Figure 9:
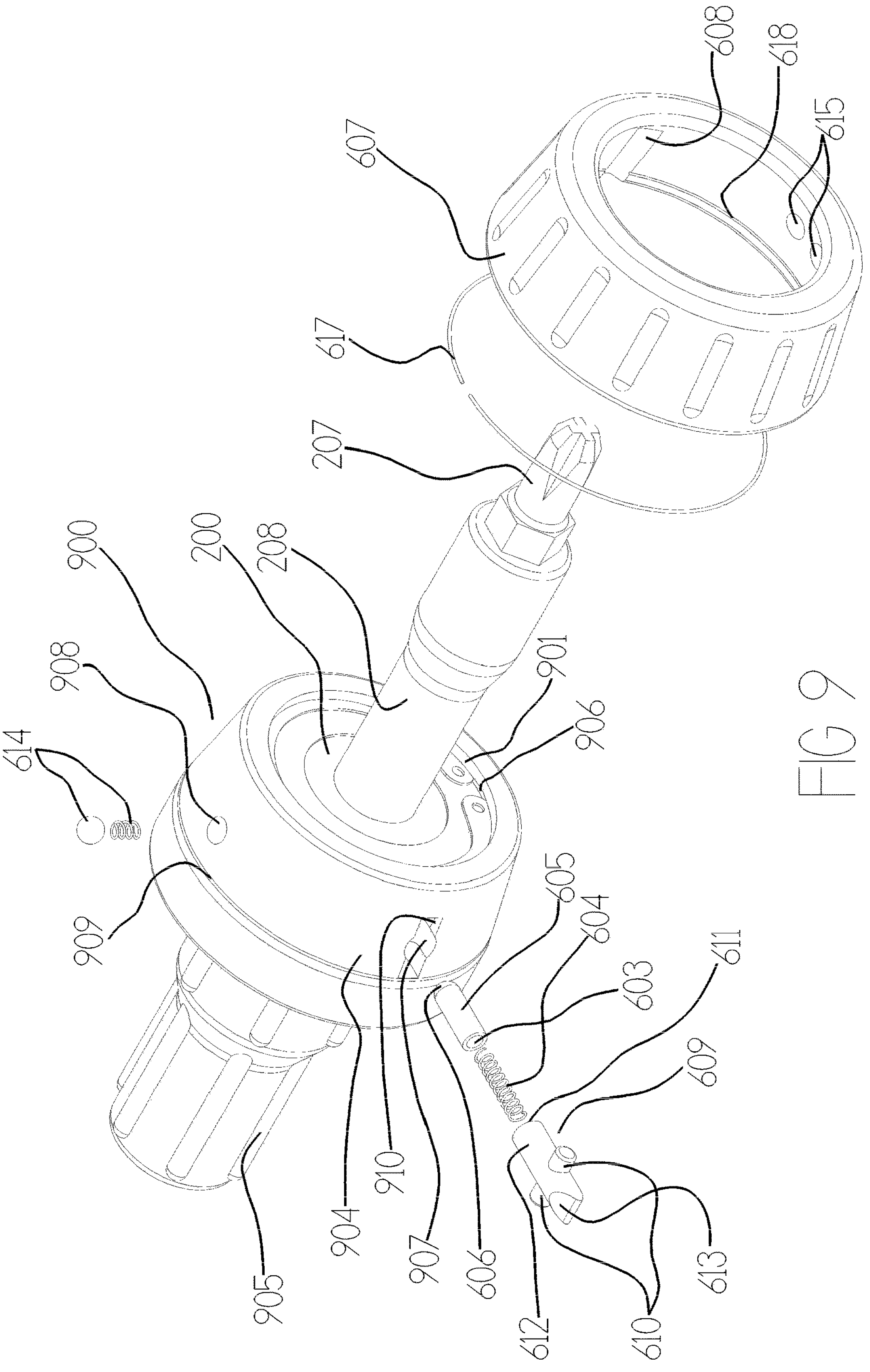
FIG. 9 is a perspective view of the screwdriver housing with the intermediate rocker switch and switch ring shown separately.
Figure 10:
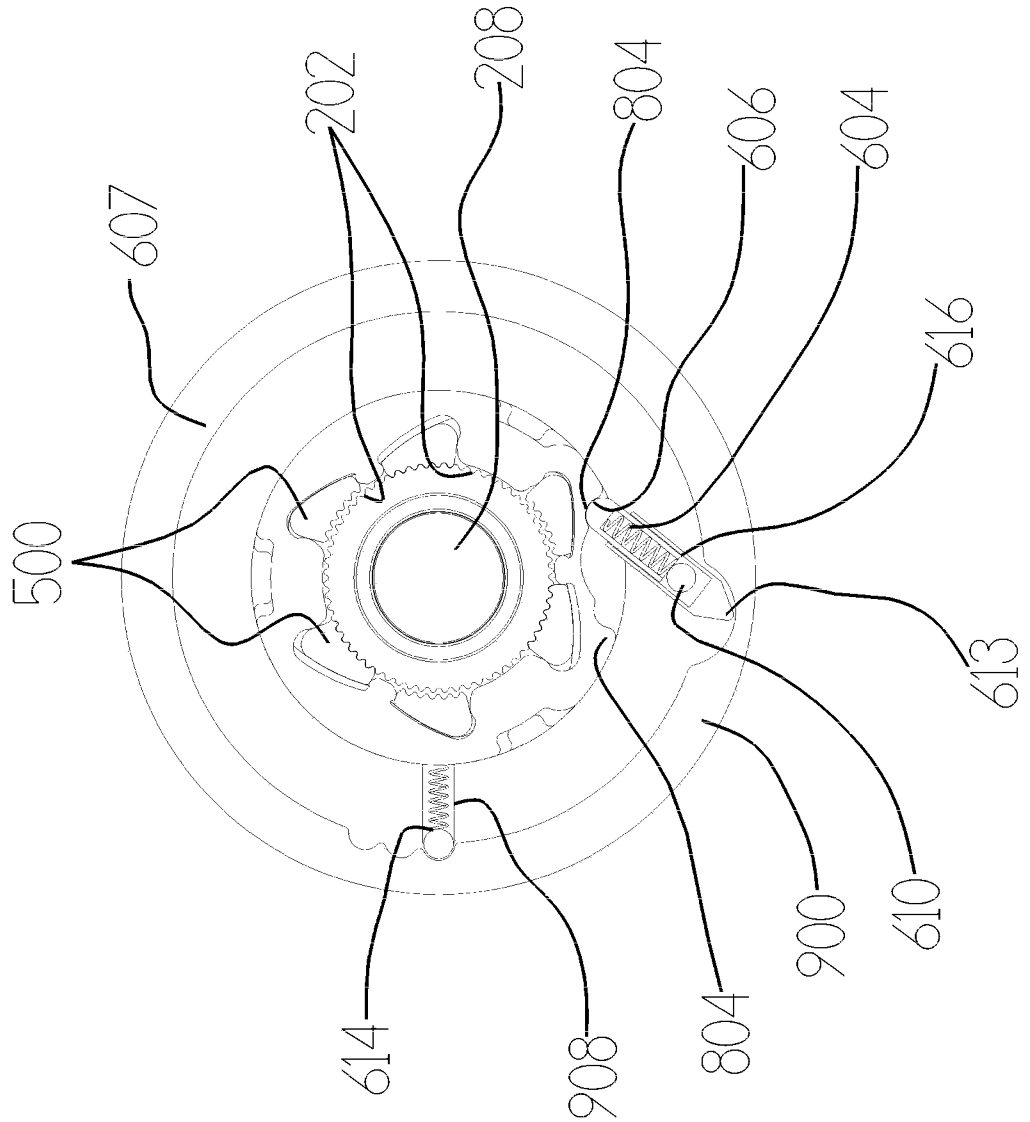
FIG. 10 is a perspective view of the screwdriver housing internals, the mechanism biased in the clockwise direction.
Figure 11:
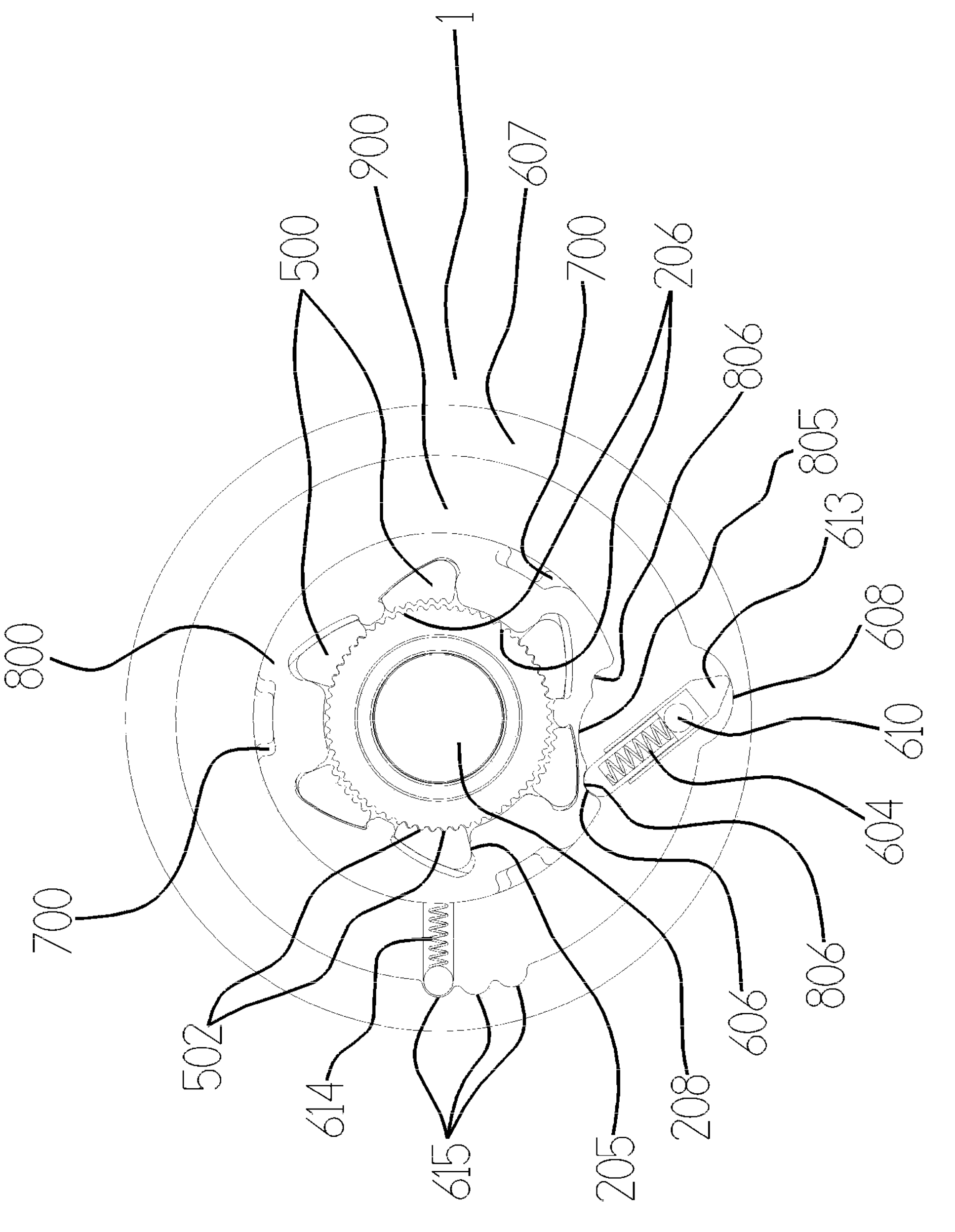
FIG. 11 is a perspective view of the screwdriver housing internals, the mechanism biased in the anti-clockwise direction.
Figure 12:
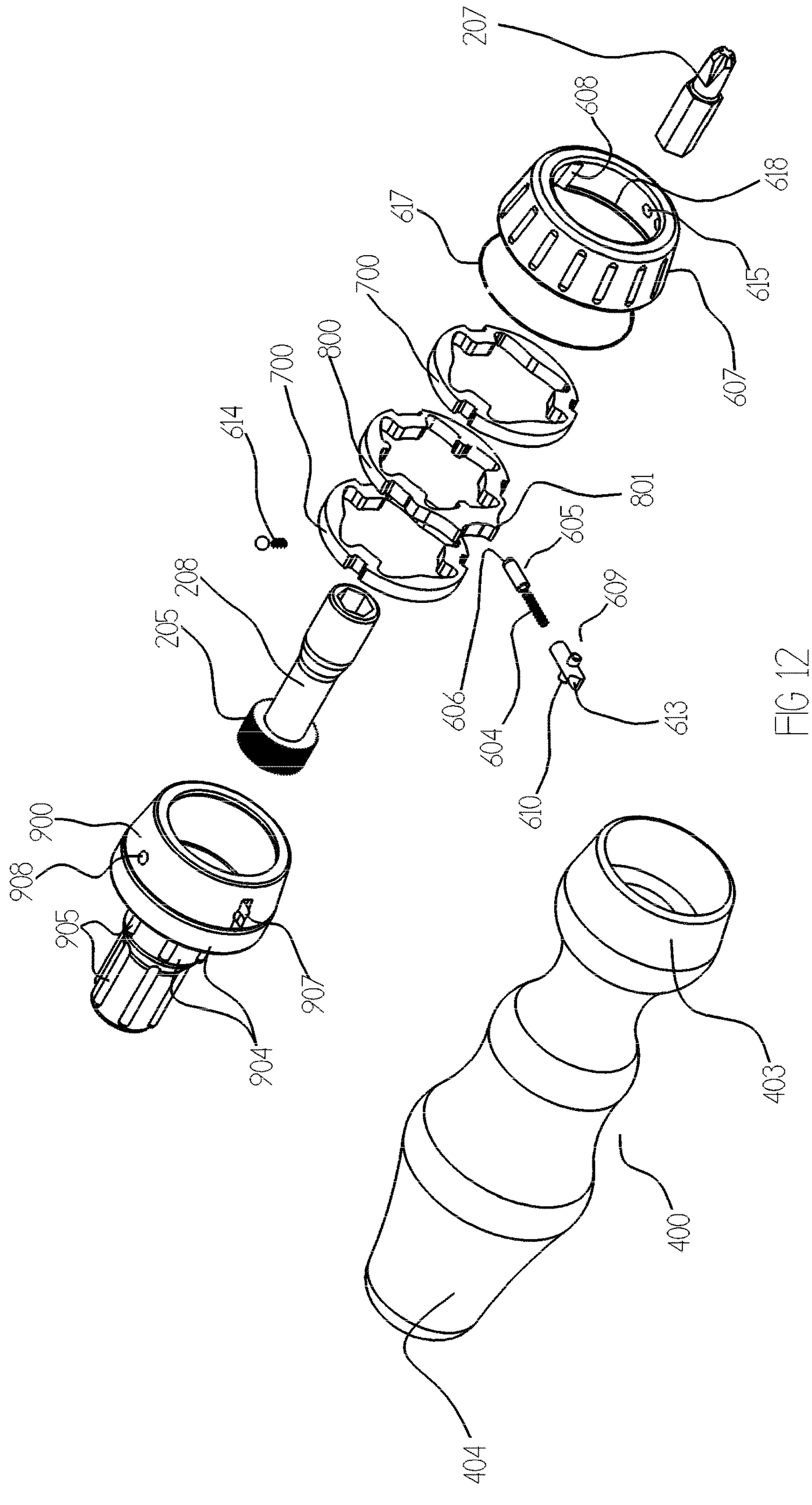
FIG. 12 is a perspective view of the screwdriver ratchet mechanism, the parts shown dismantled for display purposes.

FIGS. 9, 10 and 11 further illustrate in perspective and front profile, the dual direction ratchet 1 incorporated into a dual direction ratcheting screwdriver. The known direction biasing switch ring 607 with its rocker switch actuating profile 608 acts upon the novel intermediate rocker switch 609 actuating profile 613 in order to swivel into engagement its incumbent sprung plunger 605 engagement face 606, resiliently against the actuating layer direction profile 804 in the desired direction. The said rocker switch 609 having axles 610 which are retained, can rotate and also move radially as required in the housing molded axle slots 910 during the direction switching process. The switch spring 604 usefully acting in both directions, urging the said rocker switch actuating profile 613 into engagement with the switch ring direction actuating profile 608, whilst further acting to propel the sprung plunger engagement face 606 against the actuating layer direction profile 804.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A fastening tool ratchet mechanism comprising:

a body defining a driven element chamber;

a driven element having an outer surface provided with a plurality of driven element teeth, said driven element received in said driven element chamber;

a plurality of generally ring-shaped inserts disposed in said chamber, said inserts each having a through-hole and comprising at least one fixed insert that is fixed in said driven element chamber, the through-hole of said at least one fixed insert defined by a wall that comprises recesses defining ramp surfaces; and a plurality of pawls having pawl teeth, said pawls disposed in said recesses and movable along respective said ramp surfaces to cause said pawl teeth to engage with said driven element teeth to transmit a drive force from said body to said driven element, wherein said inserts are disposed one on top of another to define a stack of inserts in said driven element chamber, and wherein said plurality of inserts comprises a rotatable actuating insert and the through-hole of said rotatable insert having a wall defining a plurality of pawl engagement projections, said rotatable actuating insert being rotatable in said driven element chamber to move said pawls along said ramp surfaces.

2. A fastening tool ratchet mechanism as claimed in claim 1, wherein said driven element chamber has an inner surface configured to engage said at least one fixed insert to prevent rotation of said fixed insert in said driven element chamber.

3. A fastening tool ratchet mechanism as claim 2, wherein said inner surface is provided with formations that engage with complementary formations of said at least one fixed insert.

4. A fastening tool ratchet mechanism as claimed in claim 1, comprising three said inserts, wherein said rotatable insert is disposed between two said fixed inserts.

5. A fastening tool ratchet mechanism as claimed in claim 1, further comprising a direction changing switch to change a force applying direction of the ratchet mechanism, wherein said rotatable insert comprises a peripheral wall defining a recess having a first end wall and a second end wall and said direction changing switch is movable in said recess between said first and second end walls to selectively bear against said first and second end walls to change said force applying direction.

6. A fastening tool ratchet mechanism as claimed in claim 1, wherein said plurality of pawls comprise a set of pawls that are configured such that when moved along said ramp surfaces by said pawl engagement projections to cause said pawl teeth to engage said driven element teeth, the teeth of one pawl of said set of teeth fully engage said driven element teeth and the teeth of other pawls of said set of pawls at most partially engage said driven element teeth.

7. A fastening tool ratchet mechanism as claimed in claim 1, wherein each said insert is a planar annular member.

8. A fastening tool ratchet mechanism as claimed in claim 1, wherein each said insert is a stamped annular member.

9. A wrench or a screwdriver comprising a fastening tool ratchet mechanism comprising:

a body defining a driven element chamber;

a driven element having an outer surface provided with a plurality of driven element teeth, said driven element received in said driven element chamber;

a plurality of inserts disposed in said chamber, said inserts each having a through-hole and comprising at least one fixed insert that is fixed in said driven element chamber, the through-hole of said at least one fixed insert defined by a wall that comprises recesses defining ramp surfaces; and a plurality of pawls having pawl teeth, said pawls disposed in said recesses and movable along respective said ramp surfaces to cause said pawl teeth to engage with said driven element teeth to transmit a drive force from said body to said driven element, wherein said inserts are disposed one on top of another to define a stack of inserts in said driven element chamber, and wherein said plurality of inserts comprises a rotatable actuating insert and the through-hole of said rotatable insert having a wall defining a plurality of pawl engagement projections, said rotatable actuating insert being rotatable in said driven element chamber to move said pawls along said ramp surfaces.

10. A multiple pawl ratchet mechanism, comprising:
a head portion having a circular central chamber and a driven element received in said circular central chamber; and
a handle portion having a levering end and a levered end,
wherein the circular central chamber has an inner surface adjoining the handle portion and a further recess or connection undercut for the connection to an actuating layer direction biasing protrusion by a resilient switch plunger,
wherein the circular central chamber houses modular inserts form three layers comprising two outer fixed ramped profile layers with a sequential actuating layer capable of limited rotation between the said fixed ramped profile layers,
wherein the fixed ramped profile layers have outer locking notches which mechanically engage with corresponding head portion locking profiles, the said fixed profile layers further comprising first and second ramped profiles within their central profile,
wherein three sets of equally spaced opposing direction pawls are situated within said corresponding ramped profiles,
wherein the middle sequential actuating layer has engagement and disengagement profiles at either end of its pawl recesses, these said profiles project in the chosen direction the incumbent pawls against the corresponding fixed layer ramped profiles in the chosen clockwise CWD or anticlockwise drive direction ACWD whilst simultaneously disengaging the said pawls facing in the opposite direction, the said pawls outer ramped profile acting against the corresponding fixed layer pawl ramped profile in the chosen drive direction CWD or ACWD, the engaged pawls teeth engaging with the drive element teeth in order to drive as required the same, the actuating layer is resiliently propelled in the chosen clockwise or anticlockwise direction by a ratchet switch having a sprung plunger whose engagement face acts against the said actuating layer chosen sprung plunger positional indent, when utilized in the reverse or reposition direction R the actuating layer with its incumbent pawls, resiliently circumferentially rotating against the said sprung plunger, further allowing the pawl teeth engaged within the drive element teeth to resiliently slide over one another during the reposition R action.

11. The ratchet mechanism claimed in claim 10, further comprising a ratchet switch for resiliently propelling said actuating layer resiliently in a chosen clockwise CWD or anticlockwise direction ACWD, said ratchet switch incorporating a sprung plunger whose engagement face acts against the actuating layer engagement and disengagement profiles.

12. The ratchet mechanism claimed in claim 11, wherein said actuating layer comprises a biasing protrusion and inwardly relieved scallops forming plunger contact positional indents within their directional profiles configured to prevent the ratchet switch from disengaging from its ordained operating position particularly when the ratchet mechanism is rapidly utilized in the reverse or reposition direction R.

13. The ratchet mechanism claimed in claim 11, wherein said actuating layer is a stamped or fine blanked planar and ring-shaped body.

14. The ratchet mechanism claimed in claim 10, further characterized by the use of at least two sets of pawls within their corresponding pawl recesses, the utilized drive pawls arranged to sequentially engage at the same time, the actuating layer engagement profiles acting simultaneously upon the pawl engagement biasing faces, robustly engaging the pawl teeth within the drive element teeth during the drive sequence, whilst simultaneously disengaging the pawls facing in the opposite direction.

15. The ratchet mechanism claimed in claim 10, further characterized by the use of at least three sets of pawls within their corresponding pawl recesses, the utilized drive pawls arranged to sequentially engage at the same time causing the actuating layer engagement profiles to act simultaneously upon the pawl engagement biasing faces, robustly engaging the pawl teeth into the drive element teeth during the drive sequence, the driven element thereby gripped in a manner by the three operated pawls similar to a three jaw chuck reducing the requirement for robust axle bearing surfaces within the closure portions.

* * * * *